3,169,145
PREPARATION OF ALKYLDICHLOROBORANES
Edward Gipstein, New Britain, Conn., and Clark O. Miller, Willoughby Hills, Ohio, assignors to Olin Mathieson Chemical Corporation, a corporation of Virginia
No Drawing. Filed Aug. 29, 1958, Ser. No. 758,877
8 Claims. (Cl. 260—543)

This invention relates to a new process for the preparation of alkylhalo boranes, and in particular to the preparation of alkyldichloroboranes by the reaction of olefins containing from 2 to 5 carbon atoms with boron trichloride.

The object of this invention is the preparation of alkyldichloroboranes by the reaction of olefins containing from 2 to 5 carbon atoms, which are readily available in large quantities at a low cost, and boron trichloride in a process which is simple and economical to operate. This is accomplished in accordance with this invention by reacting a gaseous mixture of olefin and boron trichloride while the reactants are in contact with a catalyst which consists essentially of activated carbon. The activated carbon can be derived from, for example, wood, peat, lignite, nutshells, bones and so forth. The reaction between the olefin and boron trichloride is generally carried out at a temperature within the range from about 300° to 900° C. and preferably within the range from 350° to 800° C. The molar ratio of olefin to boron trichloride introduced into the reaction zone will generally be within the range from 2:1 to 10:1 and preferably from 4:1 to 7:1.

In carrying out this reaction, hydrogen may also be introduced into the reaction zone to provide the necessary hydrogen to saturate the olefinic linkage. However, this is not a necessity since at the reaction temperatures proposed ample hydrogen is produced by the cracking of ethylene.

The chemical equations representing the process of this invention are as follows when the olefin used is ethylene:

(1) $C_2H_4 \rightarrow 2C + 2H_2$
(2) $C_2H_4 + H_2 + BCl_3 \rightarrow C_2H_5BCl_2 + HCl$ Suitable olefins for use in this process are ethylene, propylene, butylene, etc.

Alkyldichloroboranes are valuable chemical intermediates in that they can be utilized to prepare diborane as described in the application of Clark, Serial No. 723,608, filed March 24, 1958, now abandoned.

The following examples illustrate but do not limit the practice of this invention. In the examples the term "mole" signifies gram moles.

EXAMPLE I

The reactor utilized in this experiment was a 20 mm. (O.D.) Vycor tube packed with activated charcoal catalyst. A bed of activated charcoal (4-8 mesh, 12 inches in depth) was placed in the reactor. The reactor bed had previously been heated at 400° C. in a slow stream of nitrogen for 3 to 4 hours to remove all traces of moisture. Following this, the temperature of the reactor was adjusted to 460° C., heat being supplied by means of an electric tube furnace controlled with a variable transformer. The temperature of the reactor was measured during the experiment with a Chromel-Alumel thermocouple situated in a Vycor well located along the axis of the reactor tube.

Ethylene was led from a cylinder through a Deoxo unit for the purpose of removing all oxygen contained therein and from the Deoxo unit the gas stream was passed through a drying tower (containing indicating Drierite) to remove any water present. Next the dried ethylene gas stream was metered through a flowmeter and passed into a mixing manifold. Boron trichloride was also metered through a flowmeter and passed into the mixing manifold. From the manifold the mixed stream of boron trichloride and ethylene (5.5:1 mole ratio of ethylene to boron trichloride) was passed downwardly through the reactor. A total of 0.124 mole of boron trichloride and 0.682 mole of ethylene were fed to the reactor during a four hour period. The issuing gases, leaving the bottom of the packed reactor, were first cooled by passing through a water-cooled condenser and then passing through a series of three traps, cooled with a Dry Ice-alcohol mixture. The remaining gas mixture, after removal of product and unreacted boron trichloride in the cold traps, was passed through a water scrubber to remove hydrogen chloride. From the water scrubber, the excess ethylene and gaseous by-products were metered and then vented to a hood. The condensed liquid in the cold traps was combined under nitrogen, distilled on a vacuum line to remove any boron trichloride present and the residue analyzed.

In this experiment, a total of 0.0833 mole of boron trichloride was recovered, indicating a conversion of 0.0407 mole of 33 percent. The yield of ethyldichloroborane was 0.040 mole which represents a yield of 100 percent since no boron-containing materials other than the desired product were found. Titration of the water in the scrubber, after correction for traces of boron trichloride, showed 0.042 mole of hydrogen chloride corresponding to a 33.9 percent conversion. The ethyldichloroborane so produced was identified by means of its infrared analysis and by elemental chlorine analysis.

Table I sets forth the operating conditions and results obtained in Examples II through V. Those examples were performed similarly to Example I with the same type of catalyst and with a catalyst bed of the same size as was used in Example I.

*Table I*

| Example | II | III | IV | V |
|---|---|---|---|---|
| Catalyst | C | C | C | C |
| Time, hours | 4 | 4 | 4 | 4 |
| Temp., °C | 700 | 770 | 470 | 465 |
| Mole Ratio, $C_2H_4$:$BCl_3$ | 5:1 | 5:1 | 2.5:1 | |
| Mole Ratio, $C_2H_4$:$H_2$:$BCl_3$ | | | | 2.4:1.2:1 |
| $BCl_3$ input, moles | 0.1607 | 0.1607 | 0.192 | 0.1796 |
| $BCl_3$ recovered, moles | 0.074 | 0.0493 | 0.1184 | 0.097 |
| $BCl_3$ used, moles | 0.0867 | 0.1114 | 0.0736 | 0.0826 |
| Percent conversion (on $BCl_3$ used) | 45 | 69 | 38 | 46 |
| HCl formed, moles | 0.129 | 0.192 | 0.069 | 0.082 |
| Percent conv. (on HCl) | 74.7 | 63.4 | 35.9 | 45.6 |
| $C_2H_5BCl_2$ off, moles | 0.064 | 0.1109 | 0.073 | 0.0828 |
| Offgas analysis: | | | | |
| Percent $C_2H_4$ | 34.75 | 47.3 | 68.1 | 68.7 |
| Percent $CH_4$ | 5 | 5 | | |
| Percent $C_2H_6$ | 35 | trace | | |

EXAMPLE VI

In this experiment, propylene at the rate of 0.157 mole per hour and boron trichloride at the rate of 0.069 mole per hour (mole ratio of propylene to boron trichloride-2.1:1) were passed downwardly for a period of five hours through the reactor maintained at a temperature of 370° C. The catalyst and bed depth were the same as that of Example I. There was recovered from the cold traps 0.032 mole of propyldichloroborane which was identified by infrared and elemental chlorine analyses. The conversion, based on boron trichloride consumed, was 12 percent.

EXAMPLE VII

Propylene, hydrogen and boron trichloride in the molar ratio of 2.4:1.0:1.0 were passed downwardly through the reactor described in Example I for a period of four hours. The catalyst was the same as that utilized in Example I and the temperature of the reactor was maintained at 360° C. A total of 0.020 mole of propyldichloroborane, as identified by infrared and elemental chlorine analyses, was recovered from the cold traps. The conversion in this experiment based on boron trichloride consumed was 10 percent.

It is claimed:

1. A method for the preparation of an alkyldichloroborane which comprises reacting a monoolefin hydrocarbon and boron trichloride by passing a gaseous mixture thereof into contact with a catalyst which consists essentially of activated carbon at a temperature within the range from about 300° C. to 900° C., said monoolefin hydrocarbon being one containing from 2 to 5 carbon atoms and the molar ratio of monoolefin hydrocarbon to boron trichloride introduced into the reaction zone being within the range from about 2:1 to 10:1.

2. The method of claim 1 wherein said monoolefin hydrocarbon is ethylene.

3. The method of claim 1 wherein said monoolefin hydrocarbon is propylene.

4. A method for the preparation of an alkyldichloroborane which comprises reacting a monoolefin hydrocarbon and boron trichloride by passing a gaseous mixture thereof into contact with a catalyst which consists essentially of activated carbon at a temperature within the range from about 350° C. to 800° C., said monoolefin hydrocarbon being one containing from 2 to 5 carbon atoms and the molar ratio of monoolefin hydrocarbon to boron trichloride introduced into the reaction zone being within the range from 4:1 to 7:1.

5. The method of claim 4 wherein said monoolefin hydrocarbon is ethylene.

6. The method of claim 4 wherein said monoolefin hydrocarbon is propylene.

7. The method of claim 1 wherein said activated carbon is substantially moisture-free.

8. The method of claim 4 wherein said activated carbon is substantially moisture-free.

References Cited by the Examiner

UNITED STATES PATENTS

| | | | |
|---|---|---|---|
| 2,940,999 | 6/60 | Stern et al. | 260—543 |
| 3,060,218 | 10/62 | Willcockson | 260—543 |

LORRAINE A. WEINBERGER,
*Acting Primary Examiner.*

LEON D. ROSDOL, LEON ZITVER, *Examiners.*